Figure 4:
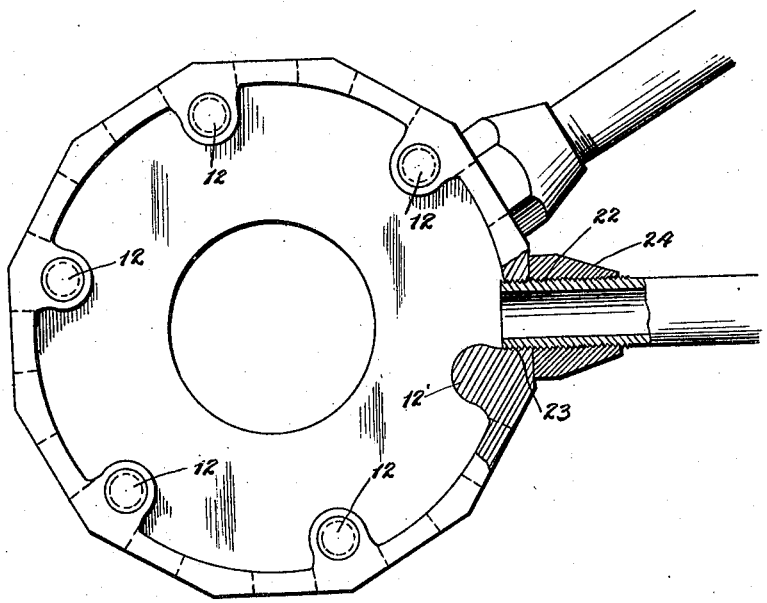

F. L. MINNICK.
WHEEL.
APPLICATION FILED DEC. 2, 1920.
1,401,630.
Patented Dec. 27, 1921.
2 SHEETS—SHEET 1.
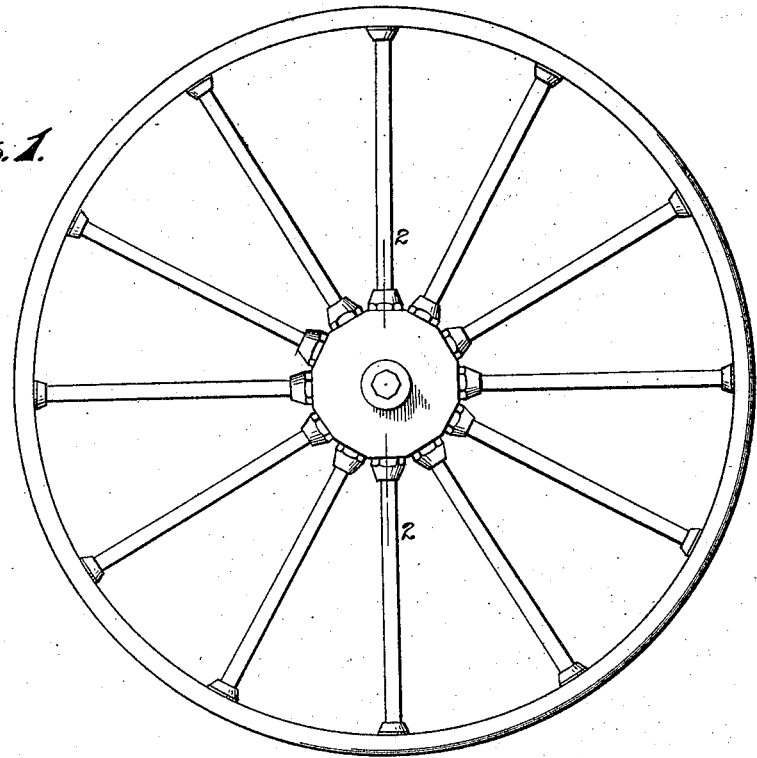
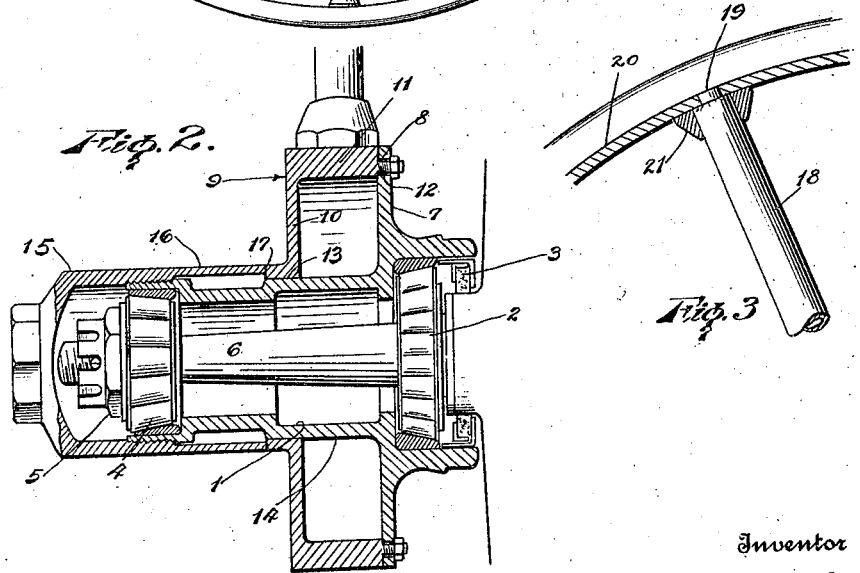
Inventor
Frederick L. Minnick.
By Lacey & Lacey, Attorneys

F. L. MINNICK.
WHEEL.
APPLICATION FILED DEC. 2, 1920.

1,401,630.

Patented Dec. 27, 1921.
2 SHEETS—SHEET 2.

Inventor
Frederick L. Minnick

By Lacey & Lacey, Attorneys

UNITED STATES PATENT OFFICE.

FREDERICK L. MINNICK, OF SPOKANE, WASHINGTON, ASSIGNOR TO TUBULAR STEEL AUTOMOBILE WHEEL MFG. CO., OF SPOKANE, WASHINGTON, A CORPORATION OF WASHINGTON.

WHEEL.

1,401,630. Specification of Letters Patent. Patented Dec. 27, 1921.

Application filed December 2, 1920. Serial No. 427,785.

*To all whom it may concern:*

Be it known that I, FREDERICK L. MINNICK, citizen of the United States, residing at Spokane, in the county of Spokane and State of Washington, have invented certain new and useful Improvements in Wheels, of which the following is a specification.

This invention relates to wheels for use especially on automotive vehicles where it is desired to carry an additional wheel mounting a fully inflated pneumatic tire.

In some instances it is customary to carry merely a rim of the demountable type having a fully inflated tire, but such practice renders it difficult to mount the rim on the wheel due to the fact that the means for securing the same thereto is usually difficult to operate and the rim may also be so firmly united with the wheel that it is difficult to demount the same.

In the present invention, the wheel is of the demountable character wherein the hubs are common to any of the wheels and, as a consequence, one or more spare wheels may be carried and may be mounted on any hub without great difficulty.

One of the important features of the present invention resides in the manner of forming a secondary hub with lugs which key it in demountable driving relation with the face plate of a main hub, the two hubs being united against relative displacement by a hub cap carried on the main hub and abutting the secondary hub.

The present invention also contemplates a rim and a secondary hub united by tubular spokes firmly secured at one end in the secondary hub and at the other end in the rim.

Figure 5:
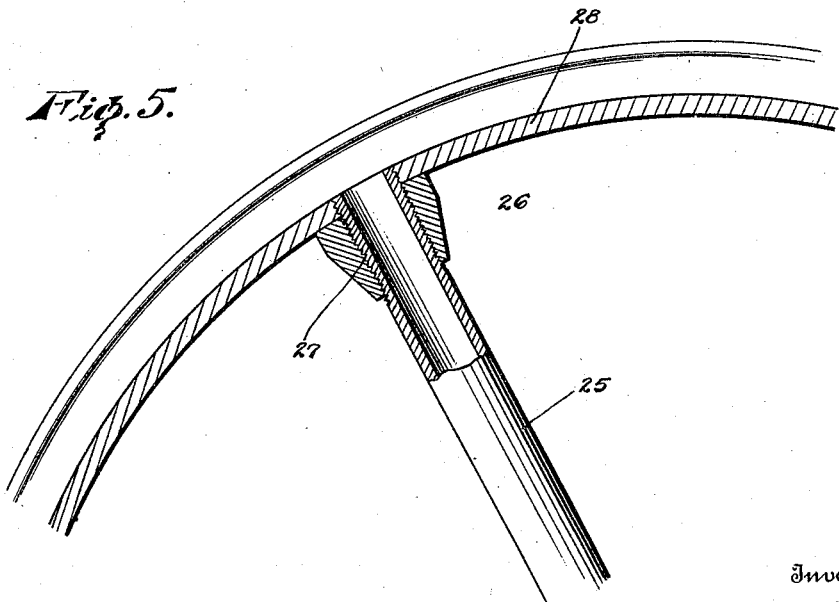

In the drawings:

Figure 1 is a side elevation of a wheel constructed in accordance with the present invention, Fig. 2 is a sectional view on the line 2—2 of Fig. 1, Fig. 3 is a fragmentary sectional view showing the rim end of one type of spoke, Fig. 4 is a fragmentary sectional view of the hub showing the driving lugs and one manner of mounting the hub ends of the spokes, Fig. 5 is a fragmentary sectional view showing a modified form of spoke end mounting.

In detail:

The hub, as herein shown, is of the type used commercially on the Ford car and consists of the tubular body 1 counterbored on the inner end to receive the bearing 2 and lubricant retaining means 3, while at the forward end it is counterbored to receive the bearing 4 which is held in place by the castellated nut 5 on the end of the axle spindle 6 and which holds the said main hub to the axle. The hub carries a face plate flange 7 which has spaced apertures which normally receive the bolts which secure the wooden spokes of the wheel between the face plate 7 and a coöperating face plate not shown here because of the fact that this coöperating face plate is discarded when using the present invention.

In the construction herein shown, a secondary hub 9 is flanged as at 10 and carries the peripheral face 11 of polygonal form and which, when the secondary hub is assembled, seats against the face plate 7, said face 11 having lugs 12 which project through the holes 8 in the face plate 7 and demountably unite the secondary hub 9 in driving relation with the main hub. The flange 10 is bored out as shown at 13 to fit over the enlarged portion 14 of the tubular main hub body 1 so that the said hub is effectively supported in concentricity with the main hub.

In order to hold the secondary hub to the main hub, the usual hub cap is replaced by the hub cap 15 having a skirt 16 which, when the hub cap is screwed home, abuts the shoulder 17 formed on the end of the bore 13.

In the form of the invention shown in Figs. 1 to 4 inclusive, the spokes 18 are each of tubular form and have formed on the outer ends thereof a lug 19 projecting through a properly located hole in the rim 20. Welded or otherwise secured at the outer end of each spoke is abutment collar 21 which, when the spoke is properly in place, seats against the inner face of the rim. The inner end or hub end of the spoke is threaded as at 22 and received in a threaded aperture 23 in the polygonal peripheral face 11 of the secondary hub 9, one spoke being received in each aperture, and each aperture being located on one of the faces of the polygonal peripheral face 11. Also, for the sake of strength, it is to be noted that this aperture adjoins the enlarged rib 12', in each case, forming the lug 12. A lock nut 24 is carried on the threaded end of each spoke and screws down against the respective faces of the particular spokes so that the spokes are thereby prevented from turning when once the wheel is assembled.

In the form of the invention shown in Fig. 5, the spoke 25 carrying a lock nut 26 on the threaded end 27, is disposed so that its rim end is received in a threaded aperture in the rim 28 and the lock nut 26 screwed tightly against the rim. This same type of fastening means may be employed at each end of the spoke.

It is to be noted that in describing this invention, the usual channel rim for receiving the clencher type of tire has been illustrated, but it is obvious that any other type of rim or felly receiving a pneumatic or solid tire directly, or a demountable rim, might be employed; or the felly or rim might be split and contracted and expanded for retaining or removing a tire by manipulation of the spokes.

Having thus described the invention, what is claimed as new is:

1. In a wheel, the combination of a main hub, an annular face plate rigid with the inner end portion of the main hub and having spaced openings therethrough adjacent its edge, a secondary hub comprising a web fitting closely upon the main hub and a peripheral member extending laterally from said web and abutting the outer side of the face plate, spokes carried by said peripheral member, lugs projecting from the edge of the peripheral member through openings in the face plate, and a cap nut fitted on the outer end of the main hub and extending inwardly thereover to abut the web of the secondary hub.

2. In a wheel, the combination of a main hub, an annular face plate rigid with the inner end portion of the main hub and having spaced openings therethrough adjacent its edge, a secondary hub comprising a web fitting closely upon the main hub and a peripheral member extending laterally from said web and abutting the outer side of the face plate, spaced transverse reinforcing ribs on the inner surface of the peripheral member of the secondary hub, lugs projecting from the peripheral member in alinement with said ribs and extending through the openings in the face plate, and a cap nut fitted on the outer end of the main hub and extending inwardly thereover to abut the web of the secondary hub.

In testimony whereof I affix my signature.

FREDERICK L. MINNICK. [L. S.]